(No Model.)
A. M. GEE.
BATTERY JAR.
No. 503,132. Patented Aug. 15, 1893.
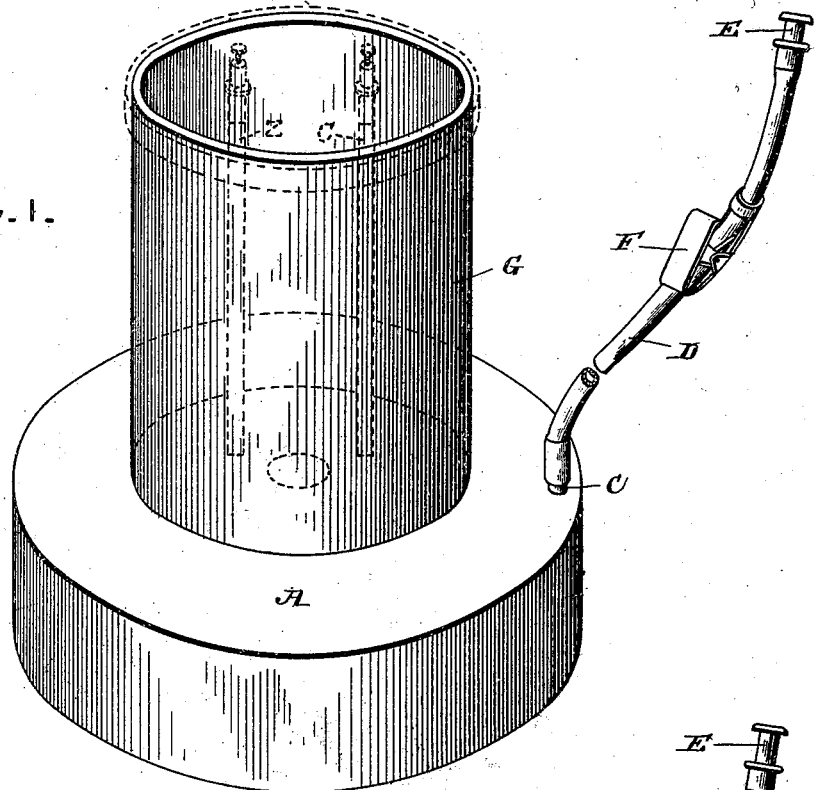
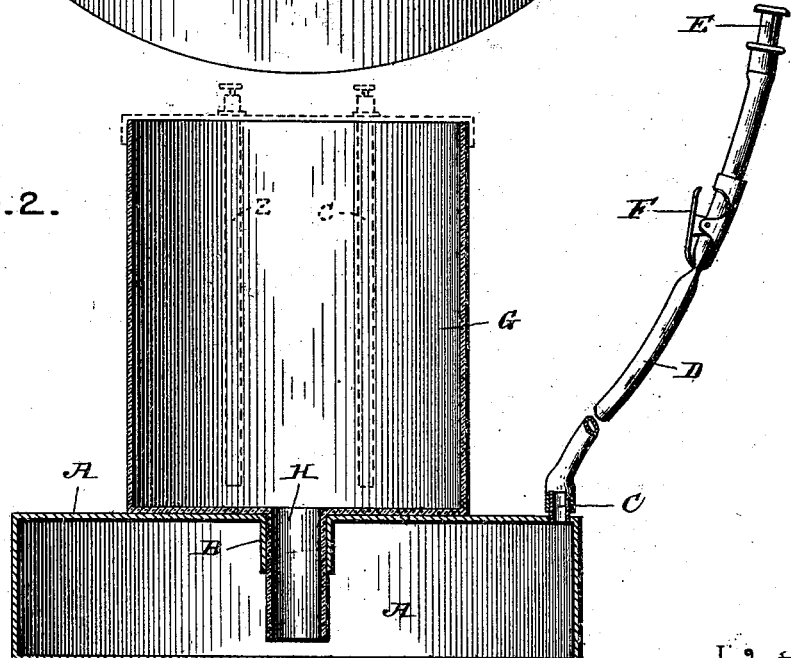
Witnesses
Harry L. Amer.
David P. Wolhaupter.
By his Attorneys,
Inventor
Alvah M. Gee.
C. A. Snow & Co.

UNITED STATES PATENT OFFICE.

ALVAH MATTHIAS GEE, OF EDGAR, NEBRASKA.

BATTERY-JAR.

SPECIFICATION forming part of Letters Patent No. 503,132, dated August 15, 1893.

Application filed February 18, 1893. Serial No. 462,872. (No model.)

*To all whom it may concern:*

Be it known that I, ALVAH MATTHIAS GEE, a citizen of the United States, residing at Edgar, in the county of Clay and State of Nebraska, have invented a new and useful Battery-Jar, of which the following is a specification.

This invention relates to electric battery jars; and it has for its object to provide certain improvements in batteries employed for the generation of electricity and in that class of batteries where the positive plate or both of the plates or elements have to be withdrawn from the battery fluid to stop chemical action and prevent the plates or elements from wasting away when not in use.

To this end the main and primary object of the invention is to provide an improved battery jar which will avoid the necessity of removing the elements from the battery liquid, so that the same can be made fast to the cell cover and more compactly arranged, while at the same time means shall be provided for immersing the elements in the battery fluid when needed, or draining the fluid from the elements when the battery is not in use.

The invention also contemplates the construction of a battery jar in which it is impossible for the battery fluid to spill out when the battery is charged, thus rendering the battery efficient in portable use.

With these and many other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a battery jar, constructed in accordance with this invention. Fig. 2 is an enlarged vertical sectional view of my improved battery jar showing the orpinary galvanic battery element therein, in dotted lines.

Referring to the accompanying drawings, A represents a battery fluid reservoir or receptacle which is designed to contain the ordinary battery fluid employed in the cells in which the elements are usually removed after using the battery. The reservoir or receptacle A, is a suitable air-tight vessel of an acid proof material, and constructed in any suitable shape, being provided centrally in the top thereof with an integral inwardly extending depending neck B, and in the top and at one side with the coupling tube C, to which is coupled one end of a suitable air-tube D, which as illustrated in the drawings is provided at one end with a nipple E, which serves as a mouth piece to force air into the reservoir A, or to which may be coupled the pipe of a suitable air pump. A clasp valve F, fits over the tube D, and when clamped thereon cuts off the supply of air into or out of the reservoir A, for the purposes to be described.

The reservoir or receptacle A, is designed to support the battery cell or jar G which rests flatly at its bottom thereon. The battery cell or jar G, is of the ordinary material and constructed in any suitable shape, the same being designed to accommodate the ordinary positive or negative elements of an electric battery as clearly shown in Fig. 2 of the drawings. The cell or jar G, is provided in the present invention, with an integral central depending fluid tube H, extended centrally from the bottom thereof and projecting through the neck B, of the reservoir or receptacle, into said receptacle and to a point in close proximity to the bottom thereof. If found desirable the jar G, may be made fast on the reservoir or receptacle so that the entire battery outfit will be efficient for portable use for physicians, &c.

From the foregoing it is thought that the construction, operation and many advantages of the herein described battery jar will be apparent without further description, and I will have it understood that changes in the form, proportion and the minor details of construction as embraced within the scope of the appended claim, may be resorted to without departing from the principle, or sacrificing any of the advantages of this invention.

Having thus described my invention, what I claim, and desire to secure by Letters Patent, is—

The combination of an air-tight battery fluid reservoir having a central opening in its top and an interior neck depending inwardly from said opening, a battery cell or jar adapted to rest flatly at its bottom on top of said reservoir and provided with an integral fluid tube H, depending centrally from its bottom and removably projecting through said neck into the reservoir to a point near the bottom of the latter, and a valved air tube connected to the top of said reservoir and communicating with the interior thereof, substantially as set forth.

In testimony that I claim the foregoing as my own I have hereto affixed my signature in the presence of two witnesses.

ALVAH MATTHIAS GEE.

Witnesses:
L. H. SHERWIN,
I. V. HOWARD.